Figure 6:
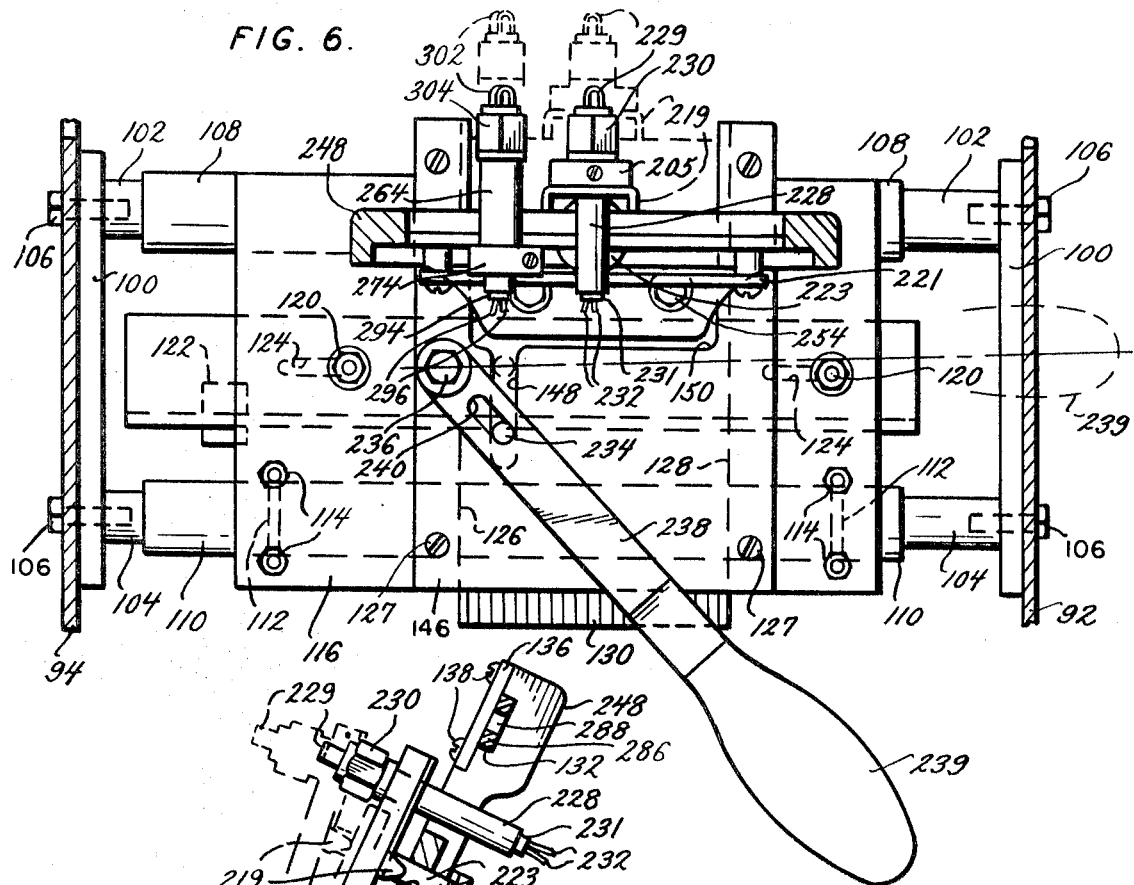

United States Patent

[11] 3,589,427

| [72] | Inventor | Millard G. Love<br>Pacific, Mo. 63069 |
|---|---|---|
| [21] | Appl. No. | 880,691 |
| [22] | Filed | Nov. 28, 1969 |
| [45] | Patented | June 29, 1971 |

[54] TIRE-GROOVING MACHINE
10 Claims, 9 Drawing Figs.

| [52] | U.S. Cl. | 157/13 |
|---|---|---|
| [51] | Int. Cl. | B29h 21/08 |
| [50] | Field of Search | 157/13 |

[56] References Cited
UNITED STATES PATENTS

| 2,262,596 | 11/1941 | Watkins | 157/13 |
|---|---|---|---|
| 2,919,749 | 1/1960 | Love | 157/13 |
| 3,075,575 | 1/1963 | Orenduff | 157/13 |

*Primary Examiner*—Granville Y. Custer, Jr.
*Attorney*—Kingsland, Rogers, Ezell, Eilers & Robbins

ABSTRACT: A cutter-bearing member is disposable adjacent the face of a tire and is movable axially of that tire to form a zigzag groove in that face; and a cutter-bearing element is moved toward that face by that cutter-bearing member but does not move axially with that cutter-bearing member, and thus forms a straight groove in that face.

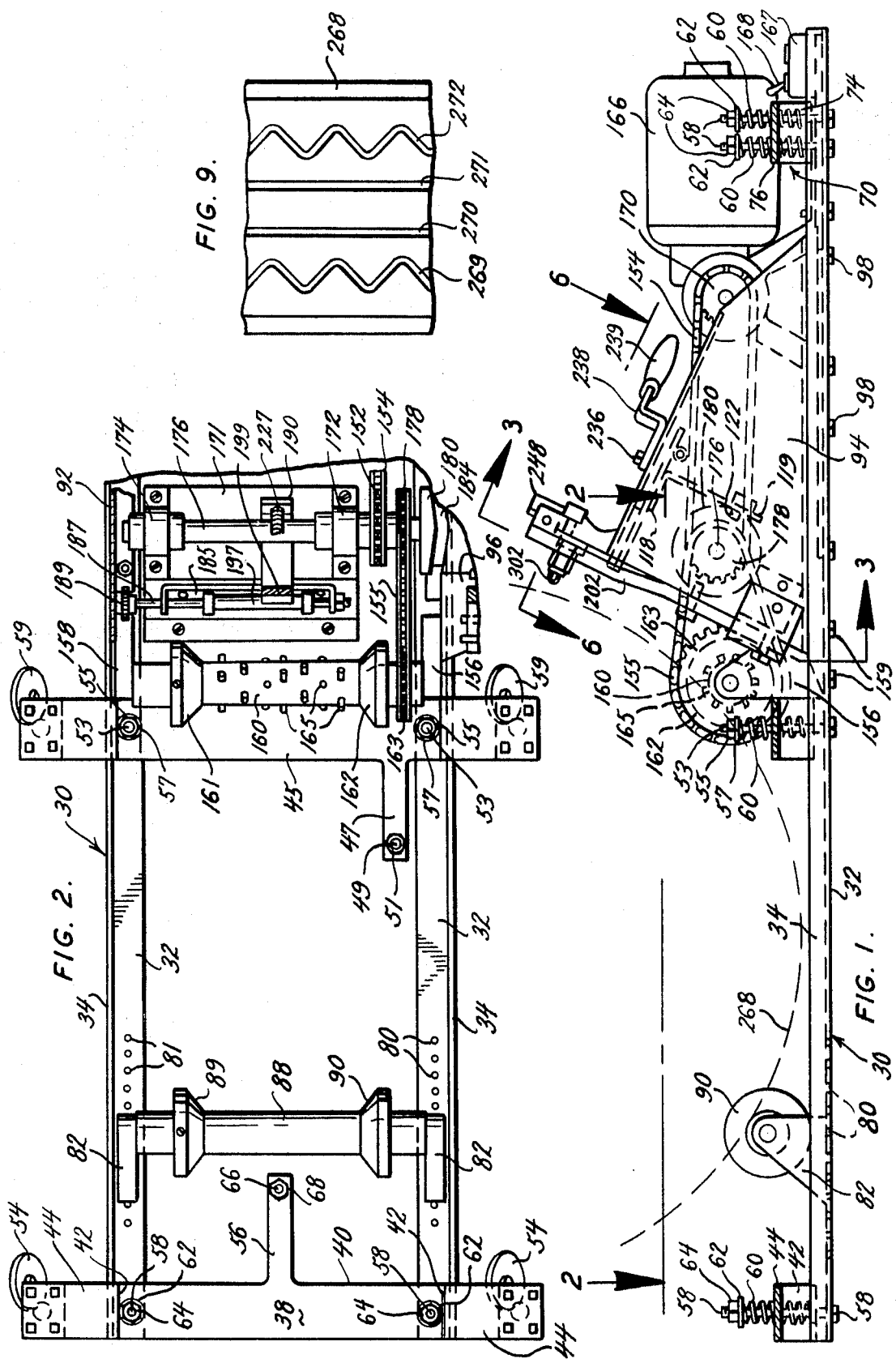

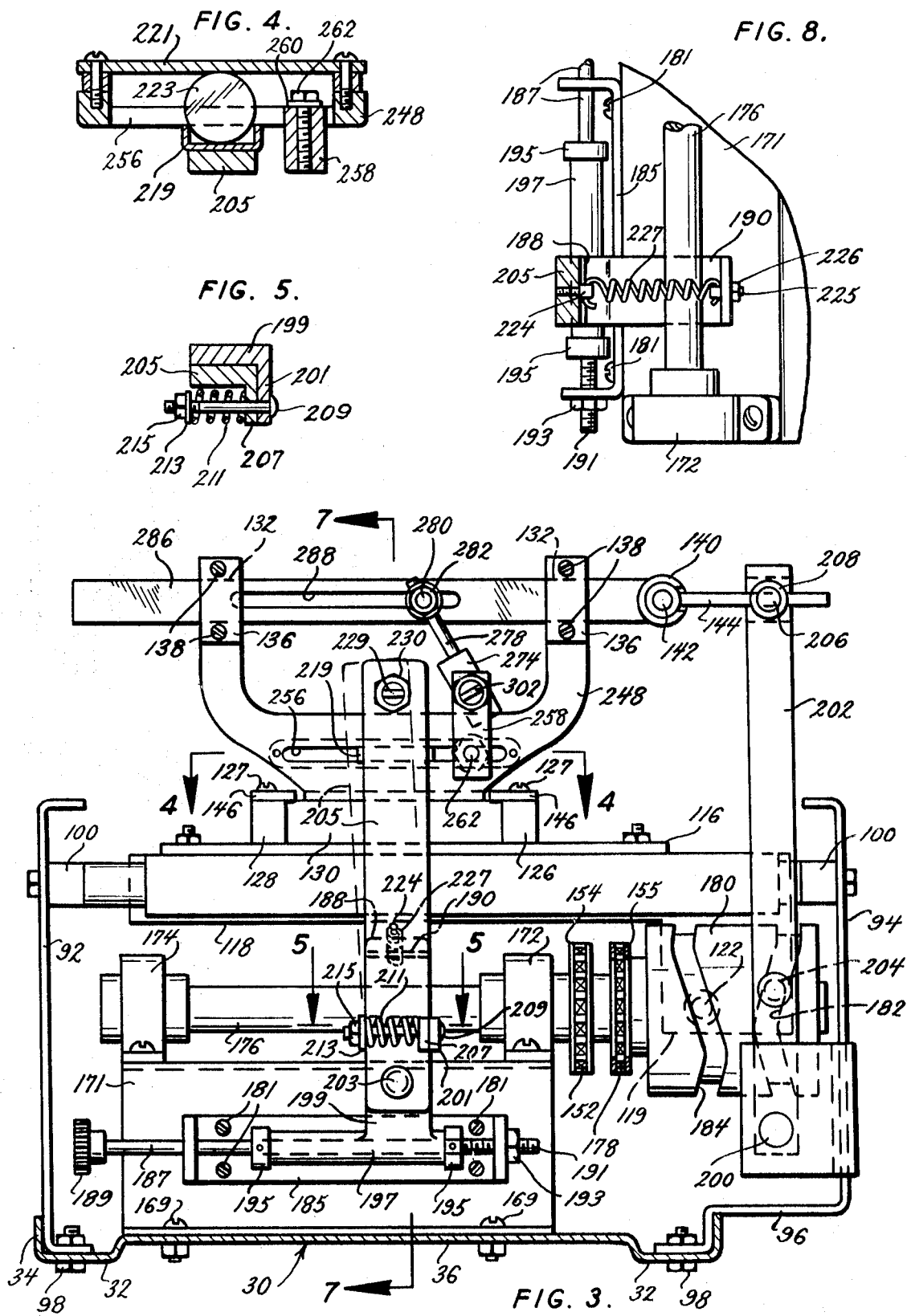

TIRE-GROOVING MACHINE

This invention relates to improvements in tire-grooving machines. More particularly, this invention relates to improvements in machines that can form individually different grooves in tires.

It is, therefore, an object of the present invention to provide an improved machine that can form individually different grooves in tires.

The present invention is an improvement on the invention for Tire Grooving Machine disclosed and claimed in my U.S. Pat. No. 2,919,749 which was granted Jan. 5, 1960. The tire-grooving machine of said patent simultaneously forms a number of zigzag grooves in the face of a tire; and that tire-grooving machine has been, and is, exceptionally useful and successful. However, some owners of automotive vehicles have expressed a desire for a tire-grooving machine which could simultaneously form individually different grooves in the face of a tire. Specifically, some owners of automotive vehicles have expressed a desire for a tire-grooving machine which could simultaneously form a zigzag groove and a straight groove in the face of a tire. The present invention provides such a tire-grooving machine; and it is, therefore, an object of the present invention to provide a tire-grooving machine which can simultaneously form a zigzag groove and a straight groove in the face of a tire.

The tire-grooving machine of the present invention has a cutter-bearing member which is disposable adjacent the face of a tire and is movable axially of that tire to form a zigzag groove in that face; and it also has a cutter-bearing element which is moved toward that face by the cutter-bearing member but which does not move axially with that cutter-bearing member, and thus forms a straight groove in that face. As a result, the tire-grooving machine of the present invention simultaneously forms a zigzag groove and a straight groove in the face of a tire. It is, therefore, an object of the present invention to provide a tire-grooving machine that has a cutter-bearing member that is disposable adjacent the face of a tire and is movable axially of that tire to form a zigzag groove in that face, and that also has a cutter-bearing element which is moved toward that face by the cutter-bearing member but which does not move axially with that cutter-bearing member, and thus forms a straight groove in that face.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 7:
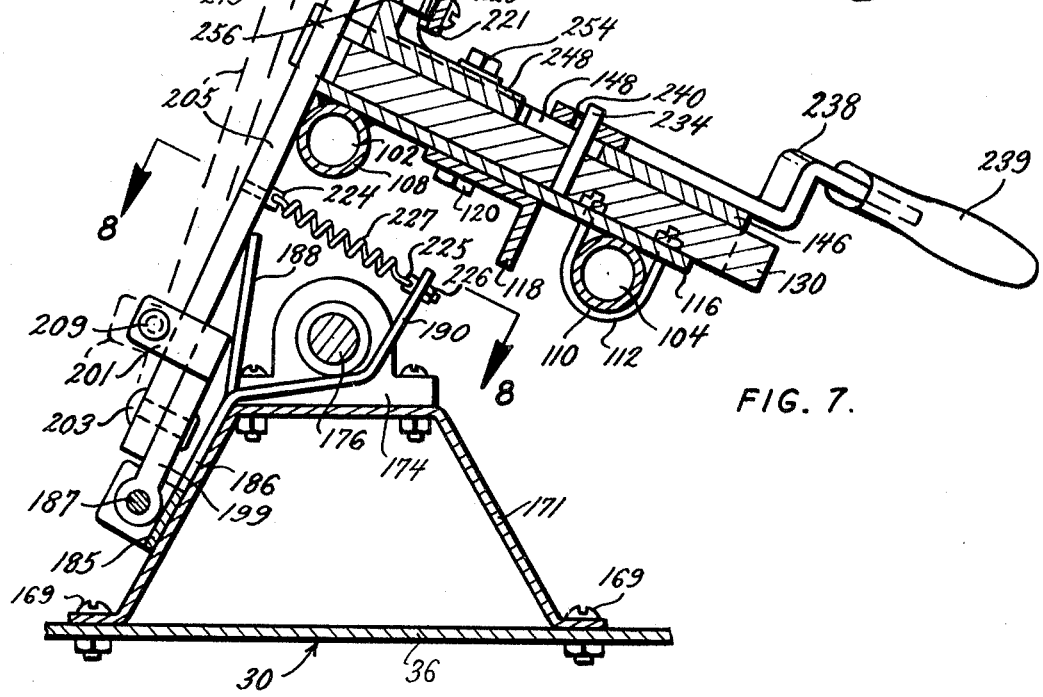

In the drawing, FIG. 1 is a partially sectioned, side elevational view of one preferred embodiment of tire-grooving machine that is made in accordance with the principles and teachings of the present invention, FIG. 2 is a sectional view of part of the tire-grooving machine of FIG. 1, and it is taken along the plane indicted by the line 2—2 in FIG. 1, FIG. 3 is a sectional view, on a larger scale, through the tire-grooving machine of FIG. 1, and it is taken along the broken plane indicated by the broken line 3—3 in FIG. 1, FIG. 4 is a sectional view, on a still larger scale, through part of the tire-grooving machine of FIG. 1, and it is taken along the plane indicated by the line 4—4 in FIG. 3, FIG. 5 is a sectional view, on the scale of FIG. 4, through the tire-grooving machine of FIG. 1, and it is taken along the plane indicated by the line 5—5 in FIG. 3, FIG. 6 is a sectional view, approximately on the scale of FIG. 3, through part of the tire-grooving machine of FIG. 1, and it is taken along the plane indicated by the line 6—6 in FIG. 1, FIG. 7 is a sectional view, on the scale of FIG. 3, through the tire-grooving machine of FIG. 1, and it is taken along the plane indicated by the line 7—7 in FIG. 3, FIG. 8 is a sectional view, on the scale of FIG. 4, through the tire-grooving machine of FIG. 1, and it is taken along the plane indicated by the line 8—8 in FIG. 7, and FIG. 9 is an elevational view, on a reduced scale, of a portion of the face of a tire after that face has had two zigzag grooves and two straight grooves formed therein.

Referring to the drawing in detail, the numeral 30 generally denotes the baseplate of one preferred embodiment of the tire-grooving machine provided by the present invention. That baseplate is long and relatively narrow; and it is provided with elongated troughs 32 along the longer sides thereof. As shown by FIG. 3, the troughs 32 are connected to the central portion 36 of baseplate 30 by inclined walls; and those walls constitute the inner bounds of those troughs while vertically directed ribs 34 constitute the outer bounds of those troughs.

A caster bracket 38, at the left-hand end of the baseplate 30, has a generally flat, long, narrow central span 40, and has two upwardly directed offset portions 42 at the ends of that central span. Flat, horizontal surfaces 44 are contiguous with, and extend outwardly from the upwardly directed offsets 42. Antifriction bearings, not shown, underlie the flat, horizontal surfaces 44; and those antifriction bearings support casters 54. The caster bracket 38 has an arm 56 that extends to the right in FIG. 2 and that overlies part of the central portion 36 of baseplate 30; and that arm can act to hold the central span 40 of caster bracket 38 in substantial parallelism with that central portion. Openings in the arm 56 and in the central portion 36 accommodate a bolt 66 which has a nut 68 threaded onto the upper end thereof; and that bolt and nut maintain that arm and that central portion in assembled relation. Openings are provided in the central span 40 of the caster bracket 38; and those openings are in register with openings in the troughs 32 of baseplate 30. Bolts 58 have the shanks thereof extending upwardly through the openings in those troughs and in that central span; and helical compression springs 60 and washers 62 are telescoped onto the threaded upper ends of the bolts 58. Nuts 64 overlie the springs 60 and are threaded onto the upper ends of the bolts 58. The springs 60 normally hold the left-hand end of the baseplate 30 above, and out of engagement with, the floor or other surface on which the tire-grooving machine is used; but those springs will respond to the weight of a tire to permit that left-hand end to move down into engagement with that floor, as shown by FIG. 1.

The numeral 70 denotes a caster bracket which is generally similar to the caster bracket 38; and the caster bracket 70 is located adjacent the right-hand end of the baseplate 30. That caster bracket has a central span which is comparable to the central span 40 of caster bracket 38, it has upwardly directed offset portions 74 which are comparable to the upwardly directed offset portions 42, and it has flat, horizontal surfaces 76 which are comparable to the flat, horizontal surfaces 44. Antifriction bearings, not shown, underlie the flat, horizontal surfaces 76; and those antifriction bearings support casters, not shown, which are similar to the casters 54. Bolts 58 have the shanks thereof extending upwardly through openings in the troughs 32 of base plate 30 and through aligned openings in the caster bracket 70; and helical compression springs 60 and washers 62 are telescoped onto the threaded upper ends of the bolts 58. Nuts 64 overlie the springs 60 and are threaded onto the upper ends of the bolts 58. THe caster bracket 70 has an arm, not shown, which is similar to the arm 56 of the caster bracket 38; and that arm helps hold caster bracket 70 in parallelism with the central portion 36 of baseplate 30. As shown particularly by FIG. 1, the near end of caster bracket 70 has a pair of bolts 58, a pair of springs 60, a pair of washers 62, and a pair of nuts 64; and those bolts, springs, washers, and nuts will coact with a bolt, spring, washer and nut at the far end of that caster bracket to normally hold the right-hand end of baseplate 30 out of engagement with the floor or other surface on which the tire grooving machine is used. However, the three springs 60 associated with the caster bracket 70 will respond to the weight of a tire to permit that right-hand end to move downwardly into engagement with that floor.

EAch of the troughs 32 in the base plate 30 has a number of aligned openings therein adjacent the left-hand end thereof; and the openings adjacent the bottom of FIG. 2 are denoted by the numeral 80, while the openings adjacent the top of FIG. 2 are denoted by the numeral 81. The number of openings 80 is exactly equal the number of openings 81; and the spacing between the openings 80 is the same as the spacing between the openings 81.

The openings 80 and 81 accommodate pins which project downwardly from the bottom surfaces of generally triangular pivot blocks 82. Those pivot blocks are short in height and they seat in the troughs 32; and those pivot blocks rotatably support a tire-receiving element 88 in the form of a smooth-faced roller. THat roller has a generally frustoconical flange 90 and a generally frustoconical flange 89 thereon. The pins in the pivot blocks 82 are spaced the same distance from the center of the tire-receiving roller 88; and, therefore, when those pins are set in the openings 80 and 81, that tire-receiving roller will have its axis parallel to lines connecting corresponding openings 80 and 81.

A stiff plate 92, shown particularly in FIGS. 3 and 6, serves a as a supporting wall; and a stiff plate 94 also serves as a supporting wall. The plate 94 has a horizontal offset 96, as shown particularly by FIG. 3. The walls 92 and 94 are secured to the baseplate 30 by nut and bolt combinations 98 which extend through aligned openings in the folded bottoms of those walls and in the through 32.

The numeral 100 denotes elongated bars, of rectangular cross section, that are mounted at the inner faces of the walls 92 and 94; and the numeral 102 denotes a cylindrical rod that has the ends thereof abutting the confronting faces of those bars. Bolts 106 extend through aligned openings in the walls 92 and 94 and in the bars 100, and seat in threaded sockets in the ends of the rod 102. A cylindrical rod 104, comparable to the cylindrical rod 102, has the ends thereof abutting the confronting faces of the bars 100; and further bolts 106 extend through aligned openings in the walls 92 and 94 and in the bars 100, and seat in threaded sockets in the ends of the rod 104.

Prior to the time the bolts 106 are seated in the threaded sockets in the ends of the rods 102 and 104, sleeves 108 and 110 are telescoped over those rods. Those sleeves fit those rods rather closely, but are able to reciprocate relative to those rods. U-bolts 112 extend around the bottom surface of the sleeve 110 and extend upwardly through openings in a plate 116, as shown by FIG. 7. Nuts 114 are threaded onto the upper ends of the U-bolts 112; and those nuts maintain the plate 116 in assembled relation with those U-bolts, and thus with the sleeve 110. The upper surface of the sleeve 108 is welded or otherwise permanently secured to the under surface of the plate 116.

The plate 116 is stiffened by an angle 118 which is secured to that plate by nut and bolt combinations 120, as shown by FIGS. 6 and 7. That angle has its horizontal flange abutting the under surface of the plate 116, and it has its vertical flange extending perpendicularly from that under surface. The vertical flange of the angle 118 has a downwardly extending projection 119; and that projection carries a cam follower 122. The horizontal flange of the angle 118 has two longitudinally extending slots 124 therein; and those slots receive the nut and bolt combinations 120. Loosening of those nut and bolt combinations will permit movement of the angle 118 transversely of the plate 116.

Elongated prismatic guide bars 126 and 128 are mounted on the upper face of the plate 116; and those guide bars are held in position by fasteners 127, which extend through those bars and seat in threaded sockets in that plate. Those fasteners also extend through unthreaded openings in a retaining plate 146 which rests atop the guide bars 126 and 128. Those guide bars are bridged by the retaining plate 146; and those guide bars are disposed at opposite sides of a plate 130. The guide bars 126 and 128 coact with the plates 116 and 146 to confine the plate 130 for reciprocal movement relative to the plate 146. A slot 148 is provided in the plate 146; and a cutaway area 150 also is provided in that plate. THat cutaway area starts at the upper end of the plate 146, as that plate is viewed in FIG. 6; and it extends almost halfway down to the lower end of that plate. The cutaway area 150 is spaced inwardly of the confronting edges of the guide bars 126 and 128, and it defines a generally rectangular area. THe slot 148 is contiguous with, and extends downwardly from, the cutaway area 150.

The cutaway area 150 of the plate 146 accommodates a bracket 248 which has two upwardly extending arms that form a Wide U. That bracket has a central portion which abuts and rests upon the upper surface of the plate 130; and it has slots, not shown, through which bolts 254 extend to seat in threaded sockets in that plate. In addition, the bracket 248 has a pivot, not shown, which confines that bracket for rotation relative to the plate 130. The bolts 254 can be loosened to permit limited rotation of the bracket 248 relative to the plate 130 about the said pivot; and such rotation is useful because it makes it possible to set the bracket 248 so it is parallel to that portion, of the face of the tire, which is being grooved. Once the bracket 248 has been set, the bolts 254 will be tightened to prevent undesired rotation of that bracket relative to the plate 130.

The bracket 248 has a horizontally directed slot 256 in the closed end of the U formed by that bracket. A pivot block 258 has a square-faced projection which is disposed within the slot 256; and that square-faced projection resists rotation of that block relative to that slot. The pivot block 258 has a threaded opening in its square-faced projection; and that opening receives the threaded shank of a bolt 262. A washer 260 encircles the bolt 260; and that washer bears against the rear face of the bracket 248. The bolt 262 can be loosened to permit the pivot block 258 to be slid along the length of the slot 256; and that bolt can be tightened to hold that pivot block against movement relative to that bracket.

The pivot block 258 has an opening therethrough; and that opening receives a support 264 in the form of an elongated hollow rod, as shown by FIG. 6. That support readily telescopes within the opening through the pivot block 258; and that rod can readily rotate about its geometric axis relative to that pivot block. A thread, not shown, is provided at the forward end of the support 264, and that thread receives the thread on a retaining ring 304. That ring has a frustoconical surface which coacts with tapered edges on a slotted rectangular plate, not shown, to releasably clamp a U-shaped cutter 302 in assembled relation with the support 264.

The rear end of the support 264 extends rearwardly from the opening through the pivot block 258; and that rear end is encircled by a slotted clamp 274, which is shown in FIGS. 3 and 6. That clamp can be tightened to lock itself onto the rear end of the support 264; and hence that clamp and that support can be made to rotate as a unit relative to the opening through the pivot block 258.

The clamp 274 has a pin 278 extending upwardly from the upper end thereof; and the upper end of that pin extends through an opening in a pivot, not shown, which is rotatably mounted in a pivot block 280. That pivot block is held in a slot 288 in a connecting rod 286, as shown by FIG. 3. The pivot block 280 has a threaded portion that can receive a nut 282; and, when that nut is tightened on that threaded portion, that nut will apply a binding force to the connecting rod 286—thereby preventing relative movement between that pivot block and that connecting rod. However, when the nut 282 is loosened, the pivot block 280 can be slid along the slot 288 in the connecting rod 286.

Notches 132 are formed in the upwardly extending arms of the bracket 248, and those notches receive the connecting rod 286. Plates 136 span the notches 132 and overlie the connecting rod 286; and machine screws 138 extend through openings in the plates 136 and seat in the arms of the bracket 248. The notches 132 are deep enough to permit ready reciprocation of the connecting rod 286, but are shallow enough to provide full guidance for that rod.

One end of the connecting rod 286 carries a split sleeve 140; and that split sleeve accommodates a cylinder 142 which has tapered ends. That cylinder is carried by one end of a rod 144; and the other end of that rod extends to, and is held by, a slotted clamp 206. That clamp has two spaced portions which can be pulled together, as by a setscrew seated in an opening in that clamp, to clamp the rod 144. The clamp 206 has a portion which extends through an opening in that clamp to clamp the rod 144. The clamp 206 has a portion which extends through an opening in a vertically directed lever 202 and which is encircled by a locking ring 208; and that locking ring maintains that clamp and that lever in assembled relation. The lower end of the lever 202 is secured to a pivot 200; and that pivot is mounted on a bracket which is secured to and supported by the wall 94, as shown by FIG. 3. The lever 202 carries a cam follower 204 intermediate the pivot 200 and the upper end of that lever; and hence that lever provides a multiplying action of the movement of that cam follower.

The clamp 206 will normally provide a tight engagement with the rod 144. However, where desired, that clamp can be loosened so that rod can be moved transversely of that clamp. Such an arrangement facilitates the setting of the connecting rod 286 relative to the lever 202.

The support 264 has an axially extending recess therein which can receive a self-contained electrically insulated resistance element 294. Preferably, that resistance element will be of the cartridge type; and, where that is the case, it can readily be inserted into, and withdrawn from, that recess as a unit. Leads 296 extend outwardly from the rear end of the resistance element 294; and those leads extend to a male plug which can be inserted in one of the sockets of a connection box 167 at the lower right-hand corner of FIG. 1.

The numeral 152 denotes a sprocket wheel that is mounted on and carried by a rotatable shaft 176. That shaft has the opposite ends thereof supported by bearing blocks 172 and 174; and those bearing blocks are mounted on a generally trapezoidal support 171. Fasteners suitably secure the support 171 in position on the baseplate 30. A second sprocket wheel 178 is mounted on the shaft 176 a short distance outwardly of the sprocket wheel 152, as shown by FIGS. 2 and 3. A cam 180 is mounted on the shaft 176 outwardly of the sprocket wheel 178; and that cam has grooves 182 and 184 therein. The groove 182 accommodates the cam follower 204 on the lever 202, and the groove 184 accommodates the cam follower 122 on the projection 119 of the angle 118.

A pivot block 156 is mounted on the baseplate 30 adjacent the wall 94, as shown by FIG. 2; and a pivot block 158 is mounted on that baseplate adjacent the wall 92. Bolts 159 extend upwardly through openings in the bottoms of the troughs 32 and seat in those pivot blocks to secure those pivot blocks to that baseplate. Those pivot blocks rotatably support a tire-receiving element 160 in the form of a roller. The axis of the tire-receiving roller 160 is parallel to the axis of the tire-receiving roller 88. The roller 160 has a generally frustoconical flange 162 and a generally frustoconical flange 161 thereon; and those frustoconical flanges are spaced apart far enough to accommodate the face of a tire. Those frustoconical flanges coact with the frustoconical flanges 89 and 90 on the roller 88 to hold a tire in the desired position above the central portion 36 of the baseplate 30.

A sprocket wheel 163 is mounted on the tire-receiving roller 160, as shown by FIG. 2; and rotation of that sprocket wheel will enforce rotation of that roller. The sprocket wheel 163 is in register with the sprocket wheel 178 on the shaft 176; and a sprocket chain 155 extends around, and meshes with, the sprocket wheels 163 and 178.

A gear motor 166 of standard design and construction is mounted on the central portion 36 of the baseplate 30. The projecting shaft of that gear motor carries a sprocket wheel 170; and that sprocket wheel is in register with the sprocket wheel 152 on the shaft 176. A sprocket chain 154 extends around, and meshes with, the sprocket wheels 152 and 170.

A pin 234 is seated within an opening in the plate 130, as shown by FIG. 7; and that pin extends upwardly through the slot 148 in the plate 146. The diameter of the pin 234 is smaller than the width of the slot 148, and hence that pin can reciprocate freely within that slot. That pin extends through an elongated slot 240 in an operating lever 238. One end of that lever is held by a pivot 236, which is shown by FIG. 6, and which extends through the plate 146 and is seated within the guide block 126. The other end of the lever 238 is provided with a hand grip 239.

With a few exceptions, all of the hereinbefore-numbered elements of the tire grooving machine can be identical to the similarly numbered components of the tire grooving machine of said patent. Moreover, the function and operation of essentially all of the hereinbefore-numbered components can be identical to the function and operation of the similarly numbered components of said patent. The exceptions are that the roller 88 herein has the frustoconical flange 89 in addition to the frustoconical flange 90 disclosed in said patent. Also, the plate 116 herein is shorter than the correspondingly numbered plate of said patent; and it does not have the forward end thereof bent downwardly at a slight angle, as does the correspondingly numbered plate of said patent. Moreover, the sleeve 108 herein is welded to the plate 116, whereas the corresponding sleeve of said patent is secured to the plate 116 by U-bolts. The roller 160 herein has a frustoconical flange 161 in addition to the frustoconical flange 162. In addition, the roller 160 has a number of circumferentially spaced and axially spaced studs 165 extending outwardly from the surface thereof. Those studs will provide a positive, nonslip, driving engagement between the roller 160 and the face of a tire to be grooved by the tire-grooving machine.

It should also be noted that the tire-grooving machine provided by the present invention has some structure which is not disclosed by said patent. For example, the tire-grooving machine of the present invention has a caster bracket 45 which overlies the baseplate 30 at a point to the left of the roller 160, as shown by FIGS. 1 and 2. That caster bracket is generally similar to the caster bracket 38; but it has an arm 47 which extends to the left thereof rather than to the right thereof. A bolt 49 has the head thereof underlying the baseplate 30, and has the shank thereof extending upwardly through aligned openings in the central portion 36 of that baseplate and in the arm 47; and a nut 51 is threaded onto the upper end of that bolt. That bolt and nut will coact with the arm 47 to hold the caster bracket 45 essentially in parallelism with the baseplate 30. Bolts 53 have the heads thereof underlying the troughs 32 of the baseplate 30, and have the shanks thereof extending upwardly through openings in those troughs and in the caster bracket 45. Helical compression springs 60 encircle the shanks of the bolts 53; and the lower end of those springs bear against flat, horizontal portions at the opposite ends of the caster bracket 45. Washers 57 are held in engagement with the upper ends of the springs 60 by nuts 55 that are threaded onto the upper ends of the bolts 53. Those springs will tend to hold the longitudinal midpoint of the baseplate 30 above the floor or other surface on which the tire grooving machine is used. However, those springs will respond to the weight of a tire to permit that longitudinal midpoint to move downwardly into engagement with that floor or other surface. Antifriction bearings, not shown, underlie flat, horizontal surfaces at the ends of the caster bracket 45, and those antifriction bearings support casters 59, which are similar to the casters 54.

Referring particularly to FIGS. 3, 7 and 8, the numeral 185 denotes a U-shaped bracket which has the closed end thereof secured to the front face of the support 171 by fasteners 181. The arms of that U-shaped bracket extend to the left from the support 171, as that U-shaped bracket and that support are viewed in FIG. 7. The left-hand arm of the U-shaped bracket 185 has an unthreaded opening therein while the right-hand arm of that U-shaped bracket has a threaded opening, as that bracket is viewed in FIG. 3. That U-shaped bracket has an extension 186 which extends upwardly along the inclined front face of the support 171, and which has a stop portion 188 and a supporting portion 190. As indicated by FIG. 7, the stop portion 188 extends generally vertically upwardly from the upper end of the extension 186, while the supporting portion 190 extends rearwardly and upwardly from the upper end of that extension. An elongated rod 187, which has a knob 189 at the left-hand end thereof and which has a thread 191 at the right-hand end thereof, is held by the openings in the arms of the U-shaped bracket 185. A sleeve 197 and two collars 195 will be disposed between the arms of the U-shaped bracket 185 as the rod 187 is assembled with that U-shaped bracket. Specifically, after the thread 191 on the rod 187 has been passed through the unthreaded opening in the left-hand arm of the U-shaped bracket 185, that thread will be passed through the left-hand collar 195 in FIG. 3, will be passed through the sleeve 197, will be passed through the right-hand collar 195, and then will be threaded into the threaded opening in the right-hand arm of that U-shaped bracket. Thereafter, pins will be passed through aligned openings in the collars 195 and in the rod 187 to fix the positions of those collars, and hence of the sleeve 197, relative to that rod. A nut 193 is threaded onto the thread 191; and that nut can be tightened against the right-hand arm of the U-shaped bracket 185 to act as a lock nut. Releasing of the nut 193, and rotation of the knob 189, will adjust the position of the sleeve 197 relative to the arms of the U-shaped bracket 185.

The numeral 199 denotes a projection which extends upwardly from the sleeve 197, as shown particularly by FIG. 7; and an ear 201 extends forwardly from the upper edge of that projection. A pivot 203 is secured to, and is carried by, the projection 199; and that pivot rotatably supports a lever 205 which extends upwardly a considerable distance above the upper end of that projection, as shown by FIG. 7. An ear 207 extends forwardly from the lever 205, and that ear is in register with the ear 201 on the projection 199. A bolt 209 extends through aligned openings in the ears 201 and 207; and the shank of that bolt is surrounded by a helical compression spring 211. A washer 213 encircles the shank of the bolt 209, and that washer is held in engagement with the left-hand end of the spring 211 by a nut 215. The spring 211 normally holds the lever 205 and the projection 199 for movement as a unit, and thus normally holds the lever 205 in the solid line position shown in FIG. 3. However, the spring 211 can yield and permit the lever 205 to be displaced into the dotted line position shown in FIG. 3.

The numeral 219 discloses a U-shaped guide which is shown particularly by FIG. 4; and that U-shaped guide is suitably secured to the rear face of the lever 205 at the level of the slot 256 in the bracket 248, as shown by FIG. 3. A flat plate 221 is secured to the rear faces of the arms of the bracket 248 adjacent the slot 256 in that bracket, as shown by FIG. 4. A roll 223, of steel or some other hard material, is disposed within the slot 256 in the bracket 248; and that roll is confined by that slot and by plate 221 and U-shaped guide 219, as shown by FIG. 4.

The numeral 224 denotes a machine screw which has a passage through the head thereof; and that machine screw is set within a threaded opening in the lever 205. As indicated by FIG. 7, the machine screw 224 is located above the level of the pivot 203, but below the level of the U-shaped guide 219. The numeral 225 denotes a bolt which has a passage through the head thereof; and the shank of that bolt passes through an opening in the supporting portion 190 which extends rearwardly and upwardly from the upper end of the extension 186. A nut 226 is threaded onto the shank of the bolt 225 to maintain that bolt in assembled relation with the supporting portion 190. A helical extension spring 227 has one end thereof held by the passage in the head of the machine screw 224 and has the other end thereof held by the passage in the head of the bolt 225.

Referring particularly to FIGS. 6 and 7, the numeral 228 denotes a rodlike support which is held within an opening adjacent the upper end of the lever 205; and the front end of that rodlike support extends forwardly of the lever 205 to releasably hold a U-shaped cutter 229. A retaining ring 230 is releasably secured to the front end of the support 228 to releasably hold the cutter 229 in assembled relation with that rodlike support. The rear portion of the rodlike support 228 has a cylindrical recess therein; and that cylindrical recess holds a self-contained electrically insulated resistance element 231. Leads 232 extend outwardly from the rear of the cartridge resistance element 231; and those leads extend to a male plug which can be inserted in one of the sockets of the connection box 167 at the lower right-hand corner of FIG. 1.

The gear motor 166 has leads, not shown, that extend to the connection box 167. Those leads are connected to a switch 168; and that switch can be set to drive the motor 166 in the forward direction, to drive that motor in the reverse direction, or to deenergize that motor. The switch 168 does not affect the flow of current to the heating elements 231 and 294; and hence the starting and stopping of the motor 166 does not interfere with the heating of the cutters 229 and 302.

Normally, the springs 60 hold the baseplate 30 above, and out of engagement with, the floor or other surface on which the tire-grooving machine is used; and, at such time, that tire-grooving machine contacts that floor or other surface only through the casters 54 and 59. However, when a tire 268 is resting upon the rollers 88 and 160, the springs 60 will permit the baseplate 30 to move downwardly into engagement with the floor or other surface. The pins, not shown, on the bottoms of the pivot blocks 82 can be set in engagement with various of the openings 80 and 81 in the bottoms of the troughs 32 to enable the tire-grooving machine to accommodate tires of different diameter, all as explained in the said patent.

During the time when a tire is being set in position on the rollers 88 and 160, the lever 238 will be in the solid line position shown by FIG. 6, and thus will hold the cutters 229 and 302 in the retracted positions shown by solid lines in FIG. 6. While those cutters are in those solid line positions, they will be spaced away form the tire 268, and thus will be protected against breakage as that tire is being moved into position on the rollers 88 and 160. While the cutters 229 and 302 are in the solid line positions of FIG. 6, the bolts 254 will be loosened to permit the bracket 248 to be set so the connecting rod 286 is parallel with the portion of the face of the tire 268 which is to be grooved. Once this has been done, the bolts 254 will be tightened.

The operator will check the positions of the cutters 229 and 302 relative to the face of the tire 268. In doing so, the operator will recurrently use the switch 168 to cause the motor 166 to "inch" the cam 180 to the position where the cam follower 204 is close to the position shown in FIG. 3—and thus is close to the midpoint of its travel axially of the shaft 176. If the tire 268 had four grooves in it when it was new, the cutter 302 should be in register with the centerline of the left-handmost groove in that tire and the cutter 229 should be in register with the centerline of the second left-handmost groove in that tire when cam follower 204 is close to the position shown in FIG. 3. If the cutter 302 is not directly in register with the centerline of that left-handmost groove, the nut 262 in FIGS. 3 and 4 will be loosened; and then the pivot block 258 will be shifted along the slot 256 in the bracket 248 until that cutter is moved into register with that centerline. If the cutter 229 is not directly in register with the centerline of the second left-handmost groove in the tire 268, the lock nut 193 on the thread 191 of the rod 187 will be loosened; and then the knob 189 on that rod will be rotated to cause that thread to coact with the threaded opening in the right-hand arm of the U-shaped bracket 185 to shift the sleeve 197 axially of that U-shaped bracket. Once the cutter 229 has been set directly in register with the centerline of the second-handmost groove in the tire 268, the lock nut 193 will again be used to lock the rod 187 in position.

At that time, the switch 168 will be actuated to cause the motor 166 to rotate the roller 160 in the clockwise direction, as that roller is viewed in FIG. 1. Thereupon, the tire 268 will start rotating in the counterclockwise direction; and the operator will rotate the lever 238 toward the dotted line position shown in FIG. 6. That rotation will enable the slot 240 in that lever to apply a forwardly directed force to the pin 234; and that force will move the plate 130, and thus the bracket 248, forwardly. Although the spring 227 biases the lever 205 and the cutter 229 toward the solid line positions shown in FIGS. 6 and 7, that spring will yield, as the plate 130 is moved forwardly, to enable that lever and that cutter to be moved into the dotted line positions of FIGS. 6 and 7. The cutters 229 and 302 will penetrate, and will start grooving, the face of the tire 268 as they are moved into the dotted line positions of FIGS. 6 and 7. The heated cutters 229 and 302 will readily cut grooves in the face of the tire 268; and the operator can provide the desired depth of groove by applying sufficient pressure to the hand grip 239 on lever 238 to hold the front faces of the retainer rings 230 and 304 against the face of that tire. The pressure which the operator must apply to the hand grip 239 will not change appreciably during the grooving of any one tire, or even during the grooving of all of the tires on an automotive vehicle; but the difference between the pressures that are required when the cutters 229 and 302 are new and when they are about to be replaced is very appreciable. The pressures which must be applied to the hand grip 239 are well within the capabilities of the operator; because he need only supply sufficient pressure to the hand grip 239 to hold the retaining elements 230 and 304 against the face of the tire.

The energization of the motor 166 will not only initiate rotation of the tire 268 but it will also initiate rotation of the cam 180. Rotation of that cam will force the cam followers 122 and 204 to follow the grooves 184 and 182, respectively, of that cam. Cam follower 122 will cause the angle 118 to move from side to side, and thus will cause the bracket 248 to move from side to side. The cam follower 204 will act through the lever 202 and the rod 144 to move the connecting rod 286 from side to side. The reciprocation of the bracket 248 will move the cutter 302 short distances across the face of the tire 268 while that tire is rotating in the counterclockwise direction; and hence the instantaneous point of contact of that cutter with that face will describe the line indicated by the groove 269 in FIG. 9. The reciprocation of the connecting rod 286 will shift the cutter 302 from one inclined position to another; and that shifting will occur adjacent the ends of the path of reciprocation of that bracket. That shifting is important; because the rubber in the face of the tire is so stiff that the cutter 302 could be broken by the resistance of that rubber unless that cutter was set substantially parallel to the direction of cut. As shown particularly by FIGS. 3, 7 and 8, the U-shaped bracket 185 is secured to the support 171; and the lever 205 is secured to the projection 199 on the sleeve 197—which is held by the rod 187 and that U-shaped bracket. Because the support 171 is fixedly secured to the baseplate 30, and thus can not reciprocate as the cam 180 forces the bracket 248 to reciprocate, the lever 205 and the cutter 229 will not move axially of the tire 268. Consequently, as that tire is rotated in the counterclockwise direction, the cutter 229 will form the continuous circumferential groove 270 shown in FIG. 9.

The helical extension spring 227 will urge the rear face of the lever 205 into engagement with the front face of the sleeve 108, as shown by FIG. 7; and, at such time, the rearwardly extending arms of the U-shaped guide 219 will extend rearwardly of the foremost portion of the roll 223. As a result, that guide will prevent accidental separation of that roll from the bracket 248. When the plate 130 and the bracket 248 move forwardly, in response to the movement of lever 238 toward the dotted line position in FIG. 6, the plate 221 will force the roll 223 to move the U-shaped guide 219 and the lever 205 forwardly—and thus will move the cutter 229 to the dotted line position of FIGS. 6 and 7.

As the bracket 248 responds to cam groove 184 and to cam follower 122 to reciprocate, the plate 221 carried by that bracket will reciprocate relative to the lever 205. During that reciprocation of plate 221, the roll 223 will roll and rotate, as required, to permit the lever 205 to remain stationary and not move axially relative to the tire 268. Preferably, the U-shaped guide 219 will be made to have sufficient space between the flanges thereof to permit the roll 223 to roll, and not to slip, during the reciprocation of the bracket 248 and of the plate 221. Where that is done, there will be minimal wear between the roll 223, the U-shaped guide 219, and the plate 221.

The tire 268 will be caused to apply substantial downward forces to the rollers 88 and 160; but those rollers and the pivot blocks therefor are sturdily built and will readily withstand those forces. Those downwardly directed forces will cause the rubber in the face of the tire 268 to yield and permit the studs 165 on the roller 160 to enter that face; and the resulting positive drive of the tire 268 will enable the cutters of the tire-grooving machine to provide a zigzag groove 269 and a straight groove 270.

After the roller 160 has caused the tire 268 to make one complete revolution, the operator will release his pressure on the lever 238; and that lever will return to the solid line position shown in FIG. 6. As the lever 238 moves toward that solid line position, the helical extension spring 227 will move the lever 205 and the cutter 229 from the dotted line position to the solid line position shown in FIGS. 6 and 7. Thereupon, the tire 268 will be removed from the tire-grooving machine and will be turned around so the grooves 269 and 270 are spaced away from the cutters 302 and 229, respectively, and so the ungrooved half of the face of that tire will be in register with the cutters 229 and 302. The operator can then again actuate the switch 168 to start the motor 166; and can again move the lever 238 toward the dotted line position shown in FIG. 6, to cause the cutters 229 and 302 to be moved to the dotted line positions in FIG. 6.

During the ensuing rotation of the tire 268 through one full revolution, the cutter 302 will form the groove 272, and the cutter 229 will form the groove 271 in the face of that tire. At the conclusion of the tire-grooving operation, the operator will again release his pressure on the lever 238, thereby again permitting that lever to move to the solid line position in FIG. 6; and he will again actuate the switch 168 to deenergize the motor 166. At such time the cutters 229 and 302 will be in the solid line positions shown in FIG. 6, and thus will be out of the way while the tire 268 is removed from the tire grooving machine.

It will be noted that the lever 205 and the cutter 229 move with the bracket 248 as that bracket is moved toward and away from the face of the tire 268; but the lever 205 and the cutter 229 do not move with the bracket 248 as that bracket reciprocates to move the cutter 302 axially of that tire. In this way, the cutters 229 and 302 are enabled to simultaneously form two individually different grooves in the face of the tire 268.

In adjusting the position of the pivot block 258 within the slot 256 of the bracket 248, the operator should set that pivot block so it can reciprocate without striking the lever 205. If, however, the operator accidentally sets the pivot block 258 within the slot 256 of the bracket 248 so that pivot block strikes the upper end of the lever 205 during reciprocation of that bracket, the spring 211 will yield to permit that lever to move toward the dotted line position shown in FIG. 3. In this way, that spring will prevent the development of destructive forces within the rod 187, the U-shaped bracket 185, the sleeve 197, the lever 205, the pivot block 258, the bracket 248, the angle 118, the cam follower 122, the cam 180, and the shaft 176.

The grooves which are formed in the face of a tire by the tire-grooving machine of the present invention can be apaced apart any desired distances; and those grooves do not have to be similar to, or in register with, the grooves that were initially formed in that face. In fact, the tire-grooving machine of the present invention can be used to form grooves in the faces of tires that did not initially have four grooves therein.

Whereas the drawing and accompanying description have shown and described a preferred embodiment of the present invention it should be apparent to those skilled in the art that various changes may be made in the form of the invention without affecting the scope thereof.

What I claim is:

1. A tire-grooving machine which comprises a cutter-bearing member that is selectively movable toward and away from the face of a tire in a direction which is generally radial of said tire and that is reciprocable relative to said face of said tire in a direction which is generally axial of said tire, means to reciprocate said cutter-bearing member relative to said face of said tire in said direction which is generally axial of said tire, a cutter-bearing element that is selectively movable toward and away from said face of said tire in a direction which is generally radial of said tire, and means to move said cutter-bearing member and said cutter-bearing element toward said face of said tire to cause cutters carried by said cutter-bearing member and said cutter-bearing element to penetrate and to form grooves in said face of said tire, said cutter-bearing element remaining essentially stationary axially of said tire as said cutter-bearing member reciprocates axially of said tire, whereby the cutter carried by said cutter-bearing element forms an essentially straight groove in said face of said tire while the cutter carried by said cutter-bearing member forms a zigzag groove in said face of said tire.

2. A tire-grooving machine which comprises a cutter-bearing member that is selectively movable toward and away from the face of a tire in a direction which is generally radial of said tire and that is reciprocable relative to said face of said tire in a direction which is generally axial of said tire, means to reciprocate said cutter-bearing member relative to said face of said tire in said direction which is generally axial of said tire, a cutter-bearing element that is selectively movable toward and away from said face of said tire in a direction which is generally radial of said tire, and means to move said cutter-bearing member and said cutter-bearing element toward said face of said tire to cause cutters carried by said cutter-bearing member and said cutter-bearing element to penetrate and to form grooves in said face of said tire, said cutter-bearing element remaining essentially stationary axially of said tire as said cutter-bearing member reciprocates axially of said tire, whereby the cutter carried by said cutter-bearing element forms an essentially straight groove in said face of said tire while the cutter carried by said cutter-bearing member forms a zigzag groove in said face of said tire, said cutter-bearing element being a lever that is mounted intermediate said cutter-bearing member and said tire, whereby movement of said cutter-bearing member toward said face of said tire by said moving means causes said cutter-bearing element to move toward said face of said tire.

3. A tire-grooving machine which comprises a cutter-bearing member that is selectively movable toward and away from the face of a tire in a direction which is generally radial of said tire and that is reciprocable relative to said face of said tire in a direction which is generally axial of said tire, means to reciprocate said cutter-bearing member relative to said face of said tire in said direction which is generally axial of said tire, a cutter-bearing element that is selectively movable toward and away from said face of said tire in a direction which is generally radial of said tire, and means to move said cutter-bearing member and said cutter-bearing element toward said face of said tire to cause cutters carried by said cutter-bearing member and said cutter-bearing element to penetrate and to form grooves in said face of said tire, said cutter-bearing element remaining essentially stationary axially of said tire as said cutter-bearing member reciprocates axially of said tire, whereby the cutter carried by said cutter-bearing element forms an essentially straight groove in said face of said tire while the cutter carried by said cutter-bearing member forms a zigzag groove in said face of said tire, an adjusting means controlling the position of said cutter-bearing element axially of said tire, and adjustment of said adjusting means effecting shifting of the position of the cutter carried by said cutter-bearing element relative to the position of the cutter carried by said cutter-bearing member.

4. A tire-grooving machine which comprises a cutter-bearing member that is selectively movable toward and away from the face of a tire in a direction which is generally radial of said tire and that is reciprocable relative to said face of said tire in a direction which is generally axial of said tire, means to reciprocate said cutter-bearing member relative to said face of said tire in said direction which is generally axial of said tire, a cutter-bearing element that is selectively movable toward and away from said face of said tire in a direction which is generally radial of said tire, and means to move said cutter-bearing member and said cutter-bearing element toward said face of said tire to cause cutters carried by said cutter-bearing member and said cutter-bearing element to penetrate and to form grooves in said face of said tire, said cutter-bearing element remaining essentially stationary axially of said tire as said cutter-bearing member reciprocates axially of said tire, whereby the cutter carried by said cutter-bearing element forms an essentially straight groove in said face of said tire while the cutter carried by said cutter-bearing member forms a zigzag groove in said face of said tire, a rotatable bearing element interposed between said cutter-bearing element and said cutter-bearing member to enable movement of said cutter-bearing member toward said face of said tire to effect movement of said cutter-bearing element toward said face of said tire, while minimizing frictional forces between said cutter-bearing member and said cutter-bearing element.

5. A tire-grooving machine which comprises a cutter-bearing member that is selectively movable toward and away from the face of a tire in a direction which is generally radial of said tire and that is reciprocable relative to said face of said tire in a direction which is generally axial of said tire, means to reciprocate said cutter-bearing member relative to said face of said tire in said direction which is generally axial of said tire, a cutter-bearing element that is selectively movable toward and away from said face of said tire in a direction which is generally radial of said tire, and means to move said cutter-bearing member and said cutter-bearing element toward said face of said tire to cause cutters carried by said cutter-bearing member and said cutter-bearing element to penetrate and to form grooves in said face of said tire, said cutter-bearing element remaining essentially stationary axially of said tire as said cutter-bearing member reciprocates axially of said tire, whereby the cutter carried by said cutter-bearing element forms an essentially straight groove in said face of said tire while the cutter carried by said cutter-bearing member forms a zigzag groove in said face of said tire, an antifriction connection between said cutter-bearing member and said cutter-bearing element, said antifriction connection enabling movement of said cutter-bearing member toward said face of said tire to cause movement of said cutter-bearing element toward said face of said tire while permitting said cutter-bearing member to move axially of said tire relative to said cutter-bearing element.

6. A tire-grooving machine which comprises a cutter-bearing member that is selectively movable toward and away from the face of a tire in a direction which is generally radial of said tire and that is reciprocable relative to said face of said tire in a direction which is generally axial of said tire, means to reciprocate said cutter-bearing member relative to said face of said tire in said direction which is generally axial of said tire, a cutter-bearing element that is selectively movable toward and away from said face of said tire in a direction which is generally radial of said tire, and means to move said cutter-bearing member and said cutter-bearing element toward said face of said tire to cause cutters carried by said cutter-bearing member and said cutter-bearing element to penetrate and to form grooves in said face of said tire, said cutter-bearing element remaining essentially stationary axially of said tire as said cutter-bearing member reciprocates axially of said tire, whereby the cutter carried by said cutter-bearing element forms an essentially straight groove in said face of said tire while the cutter carried by said cutter-bearing member forms a zigzag groove in said face of said tire, a roll and slot connection between said cutter-bearing member and said cutter-bearing element, said roll and slot connection enabling movement of said cutter-bearing member toward said face of said tire to cause movement of said cutter-bearing element toward said face of said tire while permitting said cutter-bearing member to move axially of said tire relative to said cutter-bearing element, said roll and slot connection including a U-shaped guide that coacts with the walls of said slot to prevent accidental removal of said roll.

7. A tire-grooving machine which comprises a cutter-bearing member that is selectively movable toward and away from the face of a tire in a direction which is generally radial of said tire and that is reciprocable relative to said face of said tire in a direction which is generally axial of said tire, means to reciprocate said cutter-bearing member relative to said face of said tire in said direction which is generally axial of said tire, a cutter-bearing element that is selectively movable toward and away from said face of said tire in a direction which is generally radial of said tire, and means to move said cutter-bearing member and said cutter-bearing element toward said face of said tire to cause cutters carried by said cutter-bearing member and said cutter-bearing element to penetrate and to form grooves in said face of said tire, said cutter-bearing element remaining essentially stationary axially of said tire as said cutter-bearing member reciprocates axially of said tire, whereby the cutter carried by said cutter-bearing element forms an essentially straight groove in said face of said tire while the cutter carried by said cutter-bearing member forms a zigzag groove in said face of said tire, a roll and slot connection between said cutter-bearing member and said cutter-bearing element, said roll and slot connection enabling movement of said cutter-bearing member toward said face of said tire to cause movement of said cutter-bearing element toward said face of said tire while permitting said cutter-bearing member to move axially of said tire relative to said cutter-bearing element, said slot being in said cutter-bearing member, and said cutter-bearing element being biased toward said cutter-bearing member to prevent accidental removal of said roll from said slot.

8. A tire-grooving machine which comprises a cutter-bearing member that is selectively movable toward and away from the face of a tire in a direction which is generally radial of said tire and that is reciprocable relative to said face of said tire in a direction which is generally axial of said tire, means to reciprocate said cutter-bearing member relative to said face of said tire in said direction which is generally axial of said tire, a cutter-bearing element that is selectively movable toward and away from said face of said tire in a direction which is generally radial of said tire, and means to move said cutter-bearing member and said cutter-bearing element toward said face of said tire to cause cutters carried by said cutter-bearing member and said cutter-bearing element to penetrate and to form grooves in said face of said tire, said cutter-bearing element remaining essentially stationary axially of said tire as said cutter-bearing member reciprocates axially of said tire, whereby the cutter carried by said cutter-bearing element forms an essentially straight groove in said face of said tire while the cutter carried by said cutter-bearing member forms a zigzag groove in said face of said tire, a roll and slot connection between said cutter-bearing member and said cutter-bearing element, said roll and slot connection enabling movement of said cutter-bearing member toward said face of said tire to cause movement of said cutter-bearing element toward said face of said tire while permitting said cutter-bearing member to move axially of said tire relative to said cutter-bearing element, an adjusting means controlling the position of said cutter-bearing element axially of said tire, and said roll and slot connection enabling said adjusting means to effect shifting of the position of said cutter-bearing element relative to the position of said cutter-bearing member axially of said tire.

9. A tire-grooving machine which comprises a cutter-bearing member that is selectively movable toward and away from the face of a tire in a direction which is generally radial of said tire and that is reciprocable relative to said face of said tire in a direction which is generally axial of said tire, means to reciprocate said cutter-bearing member relative to said face of said tire in said direction which is generally axial of said tire, a cutter-bearing element that is selectively movable toward and away from said face of said tire in a direction which is generally radial of said tire, and means to move said cutter-bearing member and said cutter-bearing element toward said face of said tire to cause cutters carried by said cutter-bearing member and said cutter-bearing element to penetrate and to form grooves in said face of said tire, said cutter-bearing element remaining essentially stationary axially of said tire as said cutter-bearing member reciprocates axially of said tire, whereby the cutter carried by said cutter-bearing element forms an essentially straight groove in said face of said tire while the cutter carried by said cutter-bearing member forms a zigzag groove in said face of said tire, said cutter-bearing element having a yieldable connection therein, and said yieldable connection yielding to prevent breakage of said cutter-bearing member or of said cutter-bearing element in the event said cutter-bearing member strikes said cutter-bearing element during the reciprocation of said cutter-bearing member axially of said tire.

10. A tire-grooving machine which comprises a cutter-bearing member that is selectively movable toward and away from the face of a tire in a direction which is generally radial of said tire and that is reciprocable relative to said face of said tire in a direction which is generally axial of said tire, means to reciprocate said cutter-bearing member relative to said face of said tire in said direction which is generally axial of said tire, a cutter-bearing element that is selectively movable toward and away from said face of said tire in a direction which is generally radial of said tire, and means to move said cutter-bearing member and said cutter-bearing element toward said face of said tire to cause cutters carried by said cutter-bearing member and said cutter-bearing element to penetrate and to form grooves in said face of said tire, said cutter-bearing element remaining essentially stationary axially of said tire as said cutter-bearing member reciprocates axially of said tire, whereby the cutter carried by said cutter-bearing element forms an essentially straight groove in said face of said tire while the cutter carried by said cutter-bearing member forms a zigzag groove in said face of said tire, said cutter-bearing element being a lever that is mounted intermediate said cutter-bearing member and said tire, said cutter-bearing member having a slot therein and having a roll disposed within said slot, said cutter-bearing element having a U-shaped guide thereon that coacts with the walls of said slot in said cutter-bearing member to prevent accidental removal of said roll, a spring biasing said cutter-bearing element toward said cutter-bearing member and radially away from said face of said tire, said spring responding to movement of said cutter-bearing member radially toward said face of said tire to yield and thereby permit said cutter-bearing element to be moved radially toward said face of said tire, an adjusting means controlling the position of said cutter-bearing element axially of said tire, and adjustment of said adjusting means effecting shifting of the position of the cutter carried by said cutter-bearing element relative to the position of the cutter carried by said cutter-bearing member.